June 29, 1971   M. COHN   3,589,957
METHOD OF APPLYING FASTENER DEVICES TO A TAPE
Filed Jan. 23, 1969
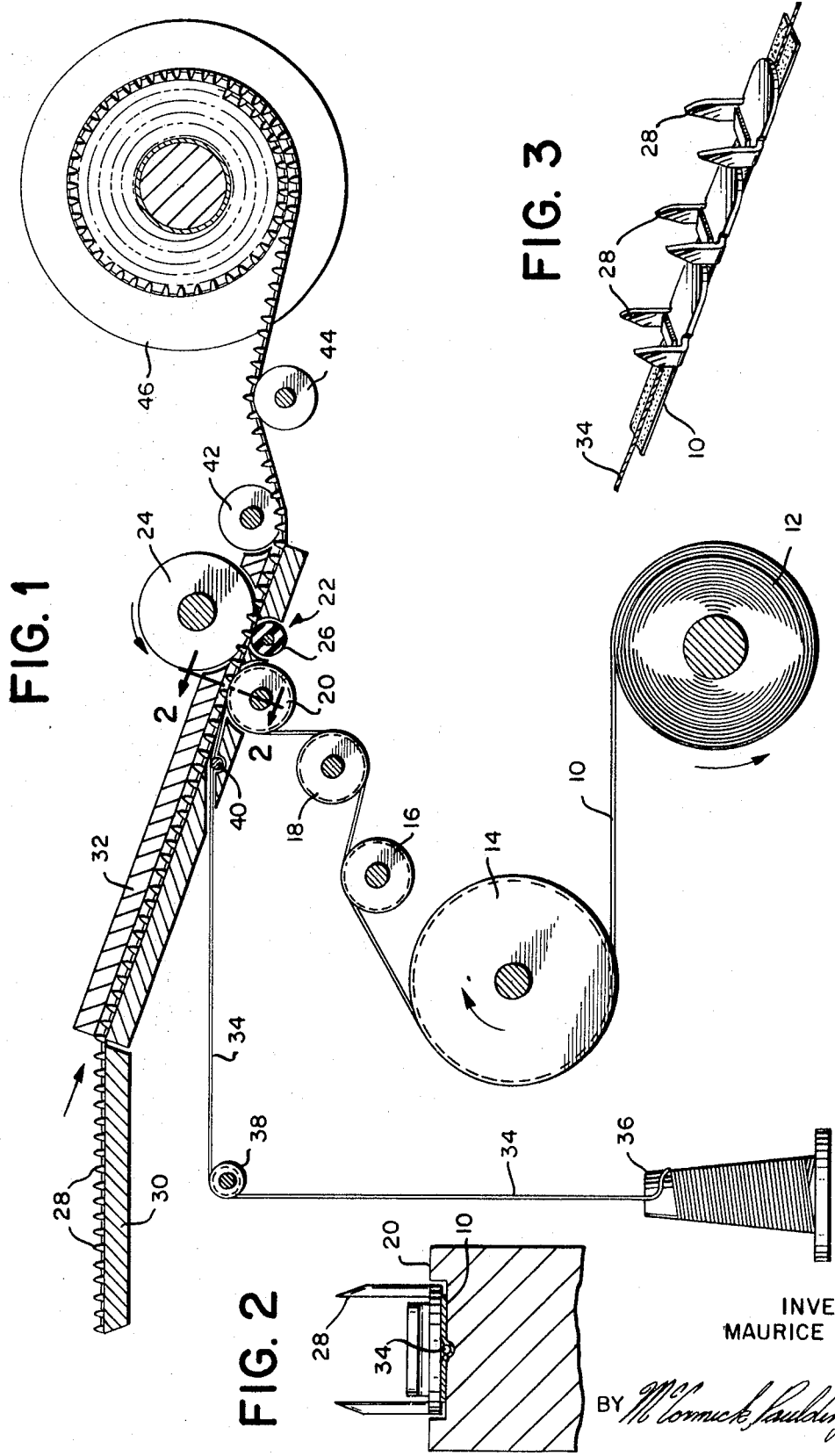
INVENTOR
MAURICE COHN
BY
ATTORNEYS

United States Patent Office 3,589,957
Patented June 29, 1971

---

3,589,957
METHOD OF APPLYING FASTENER DEVICES TO A TAPE
Maurice Cohn, South St., South Coventry, Conn.
Filed Jan. 23, 1969, Ser. No. 793,454
Int. Cl. A44b 19/42
U.S. Cl. 156—66                                        2 Claims

ABSTRACT OF THE DISCLOSURE

A method is disclosed for reinforcing a conventional pressure sensitive paper tape so that the tape can support a plurality of fastening devices, such as garment hooks or eyes, for convenient shipment and storage on reels of the type used on certain fastener applying machines.

SUMMARY OF INVENTION

This invention relates to the convenient storage and other handling of small garment type hook and eye fastener elements, and deals more particularly with an improved method for handling such devices on a reinforced pressure sensitive tape wound upon a reel which can be stored, shipped and used on fastener applying machines.

A general object of the present invention is to provide a pressure sensitive paper tape for garment type fastener elements, which tape is so constructed that it does not sag during shipment while on its storage reel, nor does it exhibit the usual tendency of such tapes to break when loaded with a plurality of such elements for storage on such reels.

BRIEF DESCRIPTION OF THE DRAWINGS

FIG. 1 is a schematic representation of one apparatus suitable for carrying out the method of the present invention.

FIG. 2 is a vertical sectional view taken on the line 2—2 of FIG. 1.

FIG. 3 is a perspective view of a tape segment representative of the hook-laden tape shown in FIG. 1.

DETAILED DESCRIPTION

Turning now to the drawing in greater detail, FIG. 1 shows an apparatus suitable for continuously feeding a pressure sensitive paper tape 10 from a supply reel 12 around a system of rollers 14, 16, 18 and 20 to a loading station, indicated generally at 22, where a plurality of hooks, or other fastener elements, are adapted to be fed onto the adhesive coated surface of the tape 10. An indexing wheel, or roller 24, is provided at the loading station 22 for positively urging each hook element 28 into engagement with the adhesive coated upper surface of the tape 10, and a rubber backup roller 26 assures that the indexing roller 24 does so engage the hook elements. The various hook elements, indicated generally at 28, 28, on the vibrating table or tray 30 are fed horizontally to the right on the tray 30 and are gravity fed down an inclined chute 32 to the loading station.

In accordance with the present invention the paper tape 10 is reinforced by a continuous strand of glass filaments 34, being withdrawn from a spool 36 around guide elements 38 and 40 so as to engage the upper adhesive coated pressure sensitive surface of the paper tape 10 slightly upstream of the loading station, and more particularly at the circumference of the roller 20. The paper tape 10 is continuously drawn through the loading station by a driven reel 46, upon which the hook-laden tape is adapted to be stored as shown. As a result of this rotation of the storage reel 46, the glass thread or strand 34 is also continuously drawn through the loading station since it adheres to the paper tape in generally centered relationship thereon as best shown in FIG. 2. As there shown the roller 20 can be seen to have a groove for receiving the paper tape 10, and also having an annular groove centered in said tape receiving groove for receiving the indented portion of the tape created by the adherence of the glass fiber thread 34. As the reinforced tape is fed through the loading station the pressure of the indexing wheel 24 positively urges the hook element 28 into engagement with the adhesive coated upper surface of the tape 10, and the finished product best shown in FIG. 3 is passed between the slack take-up reels 42 and 44, and wound on the supply reel 46.

Thus, an improved tape construction is provided with improved tensile resiliency over that formerly achieved by the use of the paper tape without a glass fiber thread to reinforce said paper tape.

The supply reel 46 having a reinforced tape stored thereon is well adapted for use in a machine for applying devices to fabric articles. The reader is referred to Pat. No. 2,852,777 issued to the inventor herein on Sept. 23, 1958 for a more complete description of one version of such a machine.

The reinforced tape construction shown and described herein is well adapted for use in such a machine as a result of the improved tensile resiliency of the tape, a characteristic which tends to prevent sagging of the tape during storage and hence facilitates installation of the supply reel 46 in a machine of the type described in the above mentioned patent. Even more significant, perhaps is the tendency for the reinforced paper tape described herein not to break during shipment so as to be rendered virtually unsuitable for use in a machine of character described in the aforementioned patent.

I claim:

1. A method for storing fastening devices on reels for later use in a machine for applying the devices to fabric articles, said method comprising unrolling a pressure sensitive paper tape from a roll and feeding the tape through a loading station, applying a single strand of continuous glass thread to the pressure sensitive side of said tape as the latter enters said loading station, feeding the fastening devices to said loading station so that each device adheres to a segment of said tape with the thread trapped therebetween to improve the tensile resiliency of the loaded tape, and reeling the loaded tape on a supply reel of the type adapted for use in a machine for applying the devices to fabric articles.

2. The method of claim 1 wherein said paper tape is unrolled with its adhesive side up, and wherein said devices are gravity fed onto said tape after the thread has been applied thereto.

References Cited

UNITED STATES PATENTS

| 1,815,434 | 7/1931  | Evans           | 156—66   |
| 2,852,777 | 9/1958  | Cohn            | 227—18   |
| 2,908,908 | 10/1959 | Steinmetz et al. | 227—18   |
| 3,160,540 | 12/1964 | Barlow et al.   | 156—66   |
| 3,208,657 | 9/1965  | Cohn            | 227—18   |
| 3,238,082 | 3/1966  | Cornell         | 156—66X  |
| 3,355,338 | 11/1967 | Heeley          | 156—92   |
| 3,440,117 | 4/1969  | Soloff et al.   | 156—92X  |

CARL D. QUARFORTH, Primary Examiner

G. G. SOLYST, Assistant Examiner

U.S. Cl. X.R.

156—92, 176; 227—18